United States Patent
Oliver et al.

(10) Patent No.: US 7,243,216 B1
(45) Date of Patent: Jul. 10, 2007

(54) APPARATUS AND METHOD FOR UPDATING A STATUS REGISTER IN AN OUT OF ORDER EXECUTION PIPELINE BASED ON MOST RECENTLY ISSUED INSTRUCTION INFORMATION

(75) Inventors: David S. Oliver, Longmont, CO (US); Willard S. Briggs, Boulder, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 698 days.

(21) Appl. No.: 10/423,211

(22) Filed: Apr. 25, 2003

(51) Int. Cl.
*G06F 7/76* (2006.01)
(52) U.S. Cl. .................. 712/218; 712/222; 712/225
(58) Field of Classification Search ........... 712/218, 712/222, 225
See application file for complete search history.

(56) References Cited

U.S. PATENT DOCUMENTS 5,826,070 A * 10/1998 Olson et al. ............... 712/222
6,151,669 A * 11/2000 Huck et al. ................ 712/222
2002/0078287 A1* 6/2002 Shinagawa et al. ......... 710/268

OTHER PUBLICATIONS

Microsoft Computer Dictionary, 2002, Microsoft Press, 5th edition.*

* cited by examiner

*Primary Examiner*—Donald Sparks
*Assistant Examiner*—Vincent Lai (57) ABSTRACT

An apparatus and method is disclosed for updating a status register in an out of order execution pipeline. In one embodiment a dispatch unit in a floating point unit sets a MRI bit flag that indicates that an instruction is the most recently issued instruction. The dispatch unit resets the MRI bit flag for all other instructions. Each execution stage of the execution pipeline keeps track of the MRI bit flag information for the instruction. A writeback unit updates the status register after the execution of the instruction that has its MRI bit flag set. The writeback unit does not update the status register for instructions that have their MRI bit flag reset. This allows the instruction to be identified that is the most recent instruction to enter the dispatch unit.

20 Claims, 7 Drawing Sheets

APPARATUS AND METHOD FOR UPDATING A STATUS REGISTER IN AN OUT OF ORDER EXECUTION PIPELINE BASED ON MOST RECENTLY ISSUED INSTRUCTION INFORMATION

TECHNICAL FIELD OF THE INVENTION

The present invention is generally directed to data processors and, in particular, to an apparatus and method in a data processor that is capable of updating a status register in an out of order execution pipeline.

BACKGROUND OF THE INVENTION

In recent years, there have been great advancements in the speed, power, and complexity of integrated circuits, such as application specific integrated circuit (ASIC) chips, random access memory (RAM) chips, microprocessor (µP) chips, and the is like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

System-on-a-chip (SOC) data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

A data processor core (i.e., central processing unit) generally comprises one or more instruction execution pipelines that execute instructions in sequential steps. Typically an instruction execution pipeline maintains status information for recently executed instructions. The status information is kept in a status register.

If the execution pipeline executes the instructions in sequential order, then the process of maintaining the status information is straightforward. The status information for each instruction is recorded in the status register as each instruction is executed. That is, the contents of the status register are updated after each instruction is executed.

Sometimes, however, instructions are executed out of order. In an out of order execution pipeline, the instructions are not executed sequentially. The order of the instructions may be rearranged. The last instruction to enter the execution pipeline may or may not be the last instruction to leave the execution pipeline. The instructions are issued in order. But after they have been issued, they may go out of order. Therefore, in an out of order execution pipeline a different method must be employed to correctly update the contents of the status register. Sequentially updating the status register as each instruction is executed will cause errors if used in an out of order execution pipeline.

Prior art methods for handing this problem include renaming the status registers to keep track of the out of order instruction executions. An example of a prior art register renaming process is set forth in U.S. Pat. No. 5,826,070. Register renaming methods are generally complex and require significant hardware resources to keep track of the correct order of execution for the instructions in the out of order execution pipeline.

Therefore, there is a need in the art for an apparatus and method that is capable of efficiently updating a status register in an out of order execution pipeline. In particular, there is a need in the art for improved system-on-a-chip (SOC) devices and other large-scale integrated circuits that comprise an apparatus and method that is capable of efficiently updating a status register in an out of order execution pipeline.

SUMMARY OF THE INVENTION

To address the above-discussed deficiencies of the prior art, it is a primary object of the present invention to provide a data processor having an apparatus and method that is capable of efficiently updating a status register in an out of order execution pipeline.

One exemplary embodiment of the apparatus of the present invention comprises a floating point unit in a data processor that comprises an execution pipeline having a plurality of execution stages that are capable of executing an instruction in a series of sequential steps. The method of the present invention assigns a "most recently issued" (MRI) bit flag data field to each instruction. The floating point unit sets the MRI bit flag (e.g., sets the bit value equal to one) for the instruction that is the most recently issued instruction. The floating point unit also resets the MRI bit flag (e.g., sets the bit value equal to zero) for all the other instructions.

The floating point unit will update the status register only after the execution of the instruction that has its MRI bit flag set. The floating point unit will not update the status register after the execution of instructions that have their MRI bit flag reset. This allows the instruction to be identified that is the most recent instruction to be issued.

If a first instruction needs to read the data in the status register, the floating point unit determines whether a second instruction with its MRI bit flag set has already been executed. If it has not yet been executed, then the floating point unit causes the first instruction to wait until the second instruction is executed and until the status register is updated to reflect the execution of the second instruction.

It is an object of the present invention to provide an apparatus and method that is capable of updating status information in a status register only when an out of order execution pipeline executes an instruction that is the most recently issued instruction.

It is also an object of the present invention to provide an apparatus and method wherein each instruction in an out of order execution pipeline comprises an MRI bit flag that indicates whether the instruction is an instruction that is the most recently issued instruction.

It is another object of the present invention to provide an apparatus comprising a dispatch unit in which the dispatch unit is capable of setting an MRI bit flag in an instruction that is the most recently issued instruction.

It is still another object of the present invention to provide an apparatus comprising a dispatch unit in which the dispatch unit is capable of resetting an MRI bit flag in all instructions that are not the most recently issued instruction.

It is also an object of the present invention to provide an apparatus comprising a writeback unit that is capable of determining whether an MRI bit flag for an executed instruction is set and is further capable of updating status information in the status register if the executed instruction has its MRI bit flag set.

It is another object of the present invention to provide an apparatus that is capable of causing a first instruction that needs to access the status register to wait until the execution of a second instruction that has its MRI bit flag set.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system-on-a-chip (SOC) device.

Figure 1:
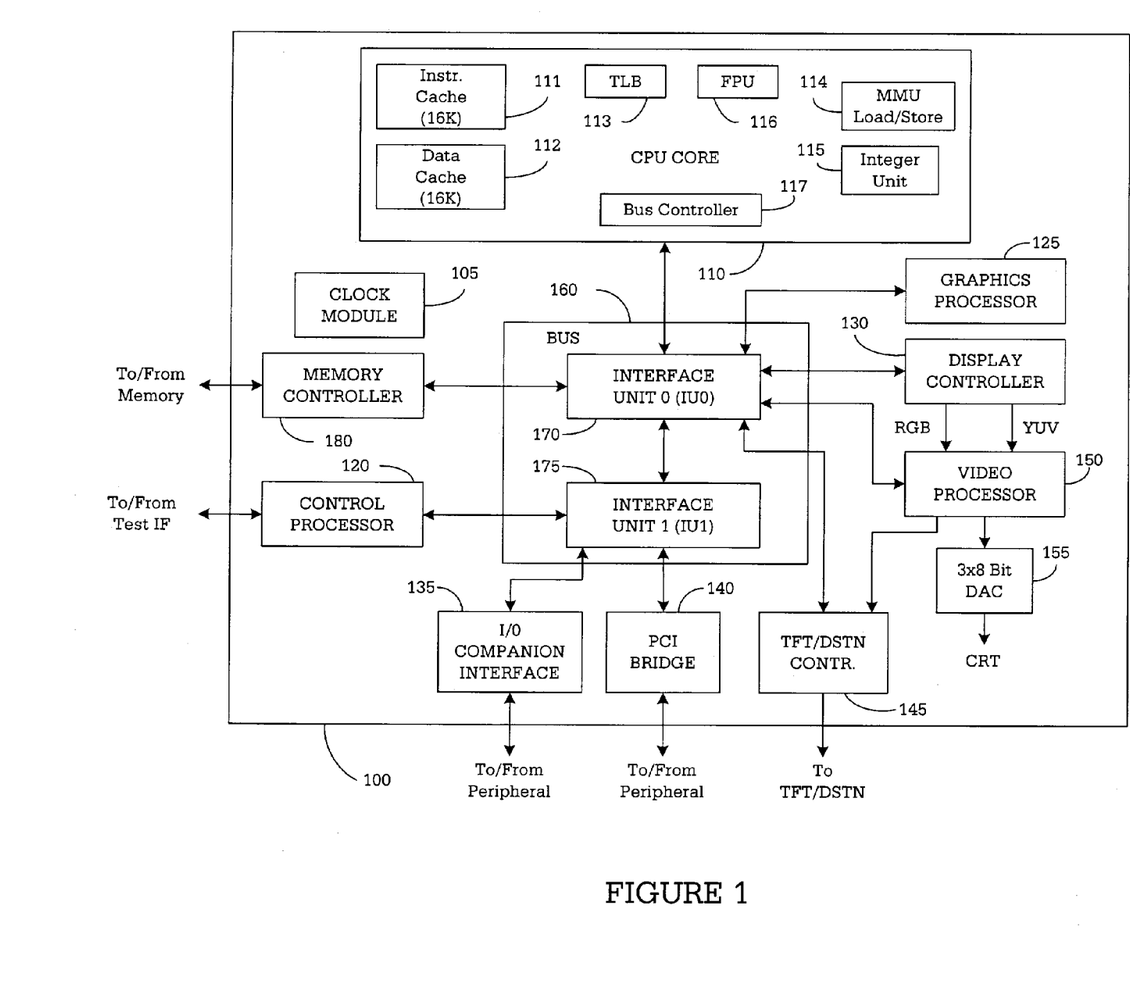
FIG. 1 illustrates an exemplary data processor according to an advantageous embodiment of the present invention.

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, three (3)×eight (8) bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is sixteen (16) kilobytes and data cache 112 is sixteen (16) kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor.

Integer unit 115 comprises an instruction pipeline and associated logic. According to an exemplary embodiment, integer unit 115 consists of a single-issue eight-stage pipeline. The eight stages of the instruction pipeline in integer unit 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data operand address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (μROM) is read for setup to Execution Unit stage.

In the Execution Unit stage, register and/or data memory fetches are fed through the Arithmetic Logic Unit (ALU) for arithmetic or logical operations. The μROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies integer unit 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, sixteen kilobyte (16 KB), four (4) way set associative cache and TLB 113 may be an eight (8) entry, fully associative, translation look-aside buffer for data and an eight (8) entry, fully associative, translation look-aside buffer for instructions. TLB 113 performs necessary address translations when in protected mode.

TLB 113 may also comprise a second-level (L2) unified (instruction and data), sixty four (64) entry, two (2) way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface.

As noted above, internal bus 160 comprises two interface units: IU0 170 and IU1 175. IU0 170 connects six (6) high-speed modules together with a seventh link to IU1 175. IU1 175 connects to three (3) low-speed modules, namely I/O companion IF 135, PCI bridge 140, and TFT/DSTN controller 145.

Memory controller 180 is the memory source for all memory accesses in processing system 100. Memory controller 180 supports a memory data bus width of sixty four (64) bits. Memory controller 180 supports two types of memory. The first type of memory is a 111 MHz 222 MT/S for DDR (Dual Data Rate). The second type of memory is a 133 MHz for SDR (Single Data Rate). Memory controller 180 supports up to one gigabyte (1 GB) of either SDR memory or DDR memory.

The modules that need access to memory are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes eight (8) bit pixels and sync signals to the GUI, which expands the pixels to twenty four (24) BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

Figure 2:
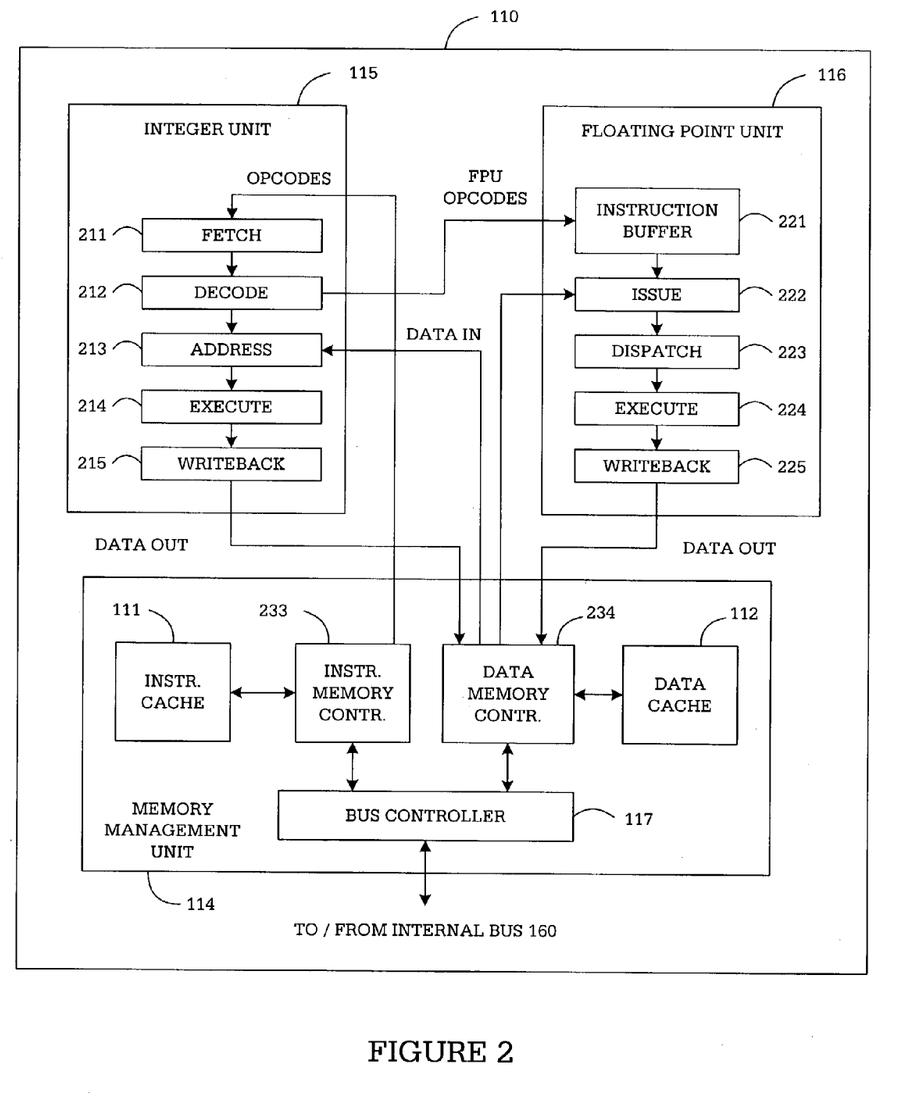
FIG. 2 illustrates an exemplary central processing unit core of the data processor shown in FIG. 1 showing a floating point unit according to the principles of the present invention.

FIG. 2 illustrates CPU core 110 in more detail showing an advantageous embodiment of floating point unit 116 of the present invention. CPU core 110 comprises integer unit (IU) 115, floating point unit (FPU) 116, and memory management unit (MMU) 114. Integer unit 115 comprises instruction fetch unit 211, instruction decode unit 212, address translation unit 213, integer execute unit 214, and writeback unit 215. Floating point unit (FPU) 116 comprises instruction buffer 221, issue unit 222, dispatch unit 223, and floating point unit (FPU) execute unit 224, and writeback unit 225. Memory management unit (MMU) 114 comprises instruction cache 111, data cache 112, instruction memory controller 233, and data memory controller 234. Bus controller 117 couples instruction memory controller 233 and data memory controller 234 to internal bus 160.

Instruction memory controller 233 fetches instructions from instruction cache (I-cache) 111. In case of a miss in instruction cache 111, instruction memory controller 233 retrieves the missed instruction from main memory (not shown) via bus controller 117 and internal bus 160. Instruction memory controller 233 then stores the retrieved instruction in instruction cache 111. Similarly, data memory controller 234 fetches data operands (DATA IN) from data cache (D-cache) 112. In case of a miss in data cache 112, data memory controller 234 retrieves the missed data operand from main memory (not shown) via bus controller 117 and internal bus 160. Data memory controller 234 then stores the retrieved data in data cache 112.

During routine operation, instruction memory controller 233 fetches instructions from instruction cache 111 and loads the instructions (i.e., opcodes) into fetch unit 211 in integer unit 115. Fetch unit 211 forwards the fetched opcodes to instruction decode unit 212 for decoding. Decoding unit 212 forwards decoded integer instruction opcodes to address translation unit 213 in integer unit 115. Address translation unit 213 calculates the correct address of the data operand and retrieves the required operand from data cache 112 via data memory controller 234.

Address translation unit 213 then forwards the integer instruction opcodes and the data operands to integer execute unit 214. After execution of the integer instruction by integer execute unit 214, writeback unit 215 writes the result to an internal register array (not shown) of integer unit 115, or to data cache 112 (via data memory controller 234), or to both.

Decoding unit 212 forwards decoded floating point unit instructions (i.e., FPU opcodes) to instruction buffer 221 in floating point unit 116. Issue unit 222 reads the decoded FPU opcodes from instruction buffer 221 and retrieves the required operand from data cache 112 via data memory controller 234. Issue unit 222 then forwards the FPU instruction opcodes and the data operands to dispatch unit 223.

Dispatch unit 223 stores the opcodes and operands in a plurality of reservation stations (not shown in FIG. 2) and subsequently transfers opcodes and operands to FPU execute unit 224 at appropriate times. After execution of the FPU opcodes by FPU execute unit 224, writeback unit 225 writes the result to an internal register array (not shown) of floating point unit 116, or to data cache 112 (via data memory controller 234).

The architecture of CPU core 110 illustrated and described above with respect to FIG. 2 is well known to those skilled in the art. It should be noted that this conventional architecture is merely illustrative of one type of data processor in which a floating point unit according to the principles of the present invention may be embodied. Those skilled in the art will readily understand that a floating point unit according to the principles of the present invention may easily be implemented in many other types of data processor architectures. It is also understood that the floating point unit described in this patent document is merely one illustrative example of the apparatus of the present invention. The apparatus of the present invention may be embodied in and utilized by any type of out of order data processing pipeline having a status register. Therefore, the descriptions of the floating point unit contained in this patent document should not be construed so as to limit the scope of the apparatus and method of the present invention.

Figure 3:
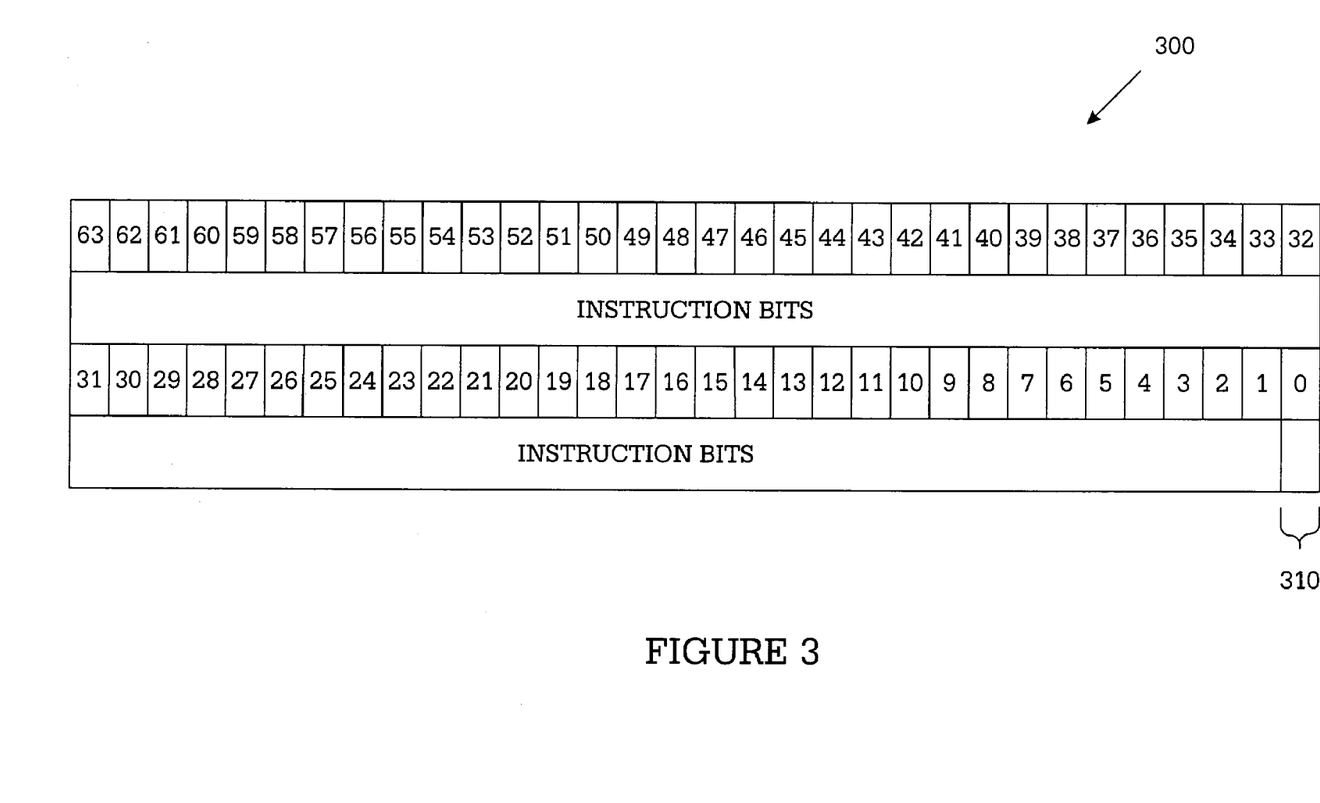
FIG. 3 illustrates an exemplary format for an instruction that comprises a bit that indicates whether or not an instruction is the most recently issued instruction.

FIG. 3 illustrates an exemplary format for an instruction that comprises a bit flag that indicates whether or not the instruction is the most recently issued instruction. In the embodiment shown in FIG. 3 bit "zero" (i.e., bit "0") is the bit that is chosen as a bit flag to indicate whether instruction 300 is the most recently issued instruction. Bit zero is identified in FIG. 3 with reference numeral 310. Bit zero may also be referred to as an "MRI bit flag" where the letters MRI stand for the expression "most recently issued."

The instruction shown in FIG. 3 is depicted as having a width of sixty four (64) bits. The choice of sixty four (64) bits is merely an example. The instruction may have a width of any selected number of bits. The width of an instruction may also vary between the stages of an execution pipeline.

The choice of bit zero in FIG. 3 to be the MRI bit flag 310 is also merely an example. Any bit in instruction 300 may be chosen to be an MRI bit flag. If MRI bit flag 310 is set equal to one ("1") then instruction 300 is the most recently issued instruction. If MRI bit flag 310 is set equal to zero ("0") then instruction 300 is not the most recently issued instruction.

Figure 4:
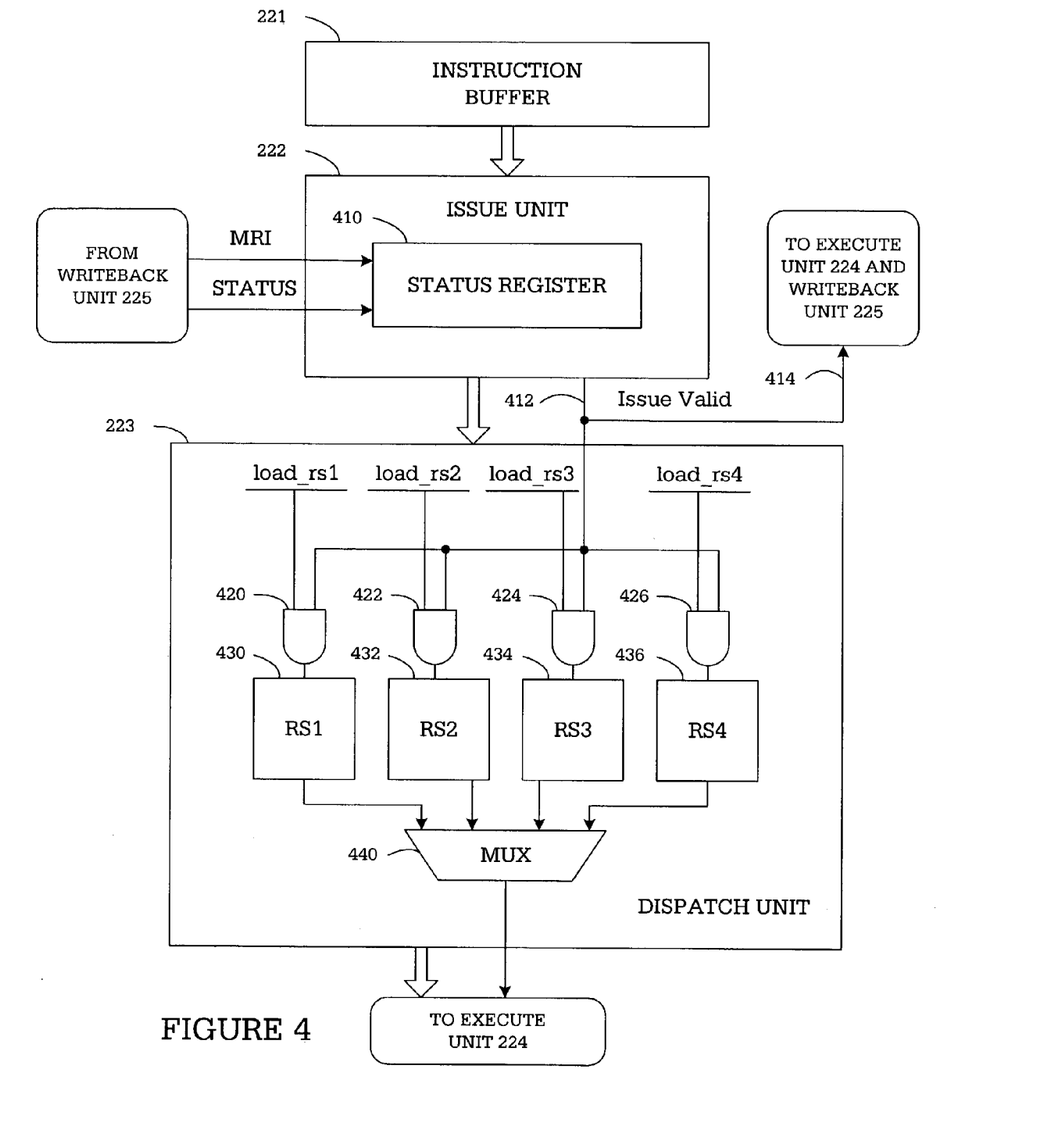
FIG. 4 illustrates an instruction buffer, an issue unit, and a dispatch unit of the floating point unit shown in FIG. 2 according to the principles of the present invention.
Figure 5:
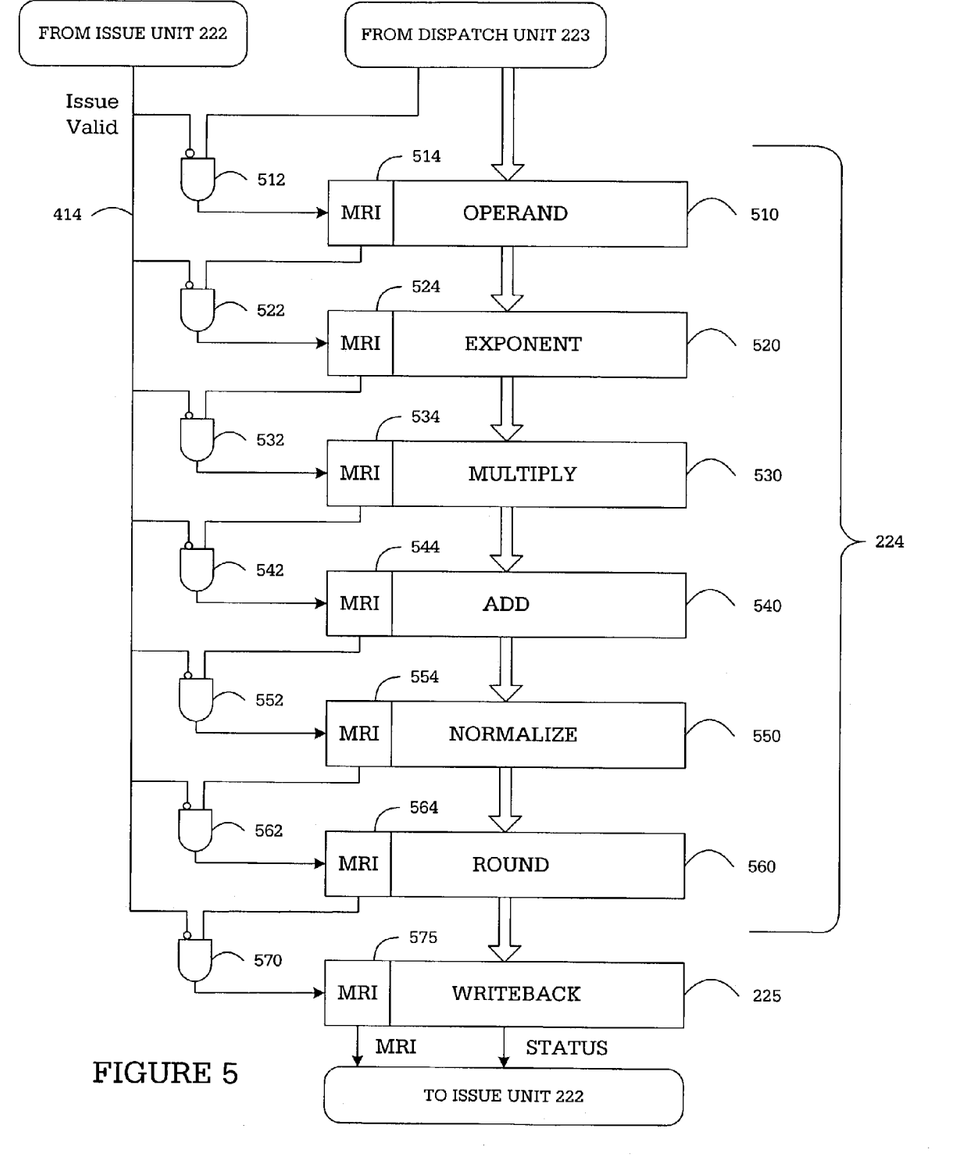
FIG. 5 illustrates an execute unit and a writeback unit of the floating point unit shown in FIG. 2 according to the principles of the present invention.

FIG. 4 illustrates in greater detail a first portion of floating point unit 116 of the present invention. As previously mentioned, floating point unit 116 comprises instruction buffer 221, issue unit 222, dispatch unit 223, and floating point unit (FPU) execute unit 224, and writeback unit 225. FIG. 4 illustrates the operation of issue unit 222 and dispatch unit 223. As shown in FIG. 2, instruction buffer 221 receives FPU opcodes from decode unit 212 in integer unit 115. Instruction buffer 221 sends instructions to issue unit 222. The flow of instructions is indicated in FIGS. 4 and 5 with a large open face arrow.

Issue unit 222 contains status register 410. As will be more fully described, writeback unit 225 is capable of sending status update information to status register 410. Writeback unit 225 is also capable of sending a value of the MRI bit flag to status register 410. Issue unit 222 sends an "Issue Valid" signal to dispatch unit 223 via control line 412. Issue unit 222 also sends the "Issue Valid" signal to execute unit 224 and to writeback unit 225 via control line 412 and control line 414. The "Issue Valid" signal indicates that issue unit 222 has issued a valid instruction.

Dispatch unit 223 comprises a plurality of reservation stations that buffer the instructions received by dispatch unit 223. The instructions that are received by dispatch unit 223 may leave dispatch unit 223 in an order that is different than the order in which they arrived. This causes the instructions that are dispatched by dispatch unit 223 to sometimes be executed out of the order in which they were received. In the exemplary embodiment shown in FIG. 4 there are four (4) reservation stations. The four (4) reservation stations are designated RS1, RS2, RS3 and RS4. The use of four (4) reservation stations is merely an example. There may be more than four or fewer than four reservation stations in dispatch unit 223. In some embodiments there may be as many as twenty (20) reservation stations.

Each of the reservation stations 430, 432, 434 and 436, is capable of setting the MRI bit flag for an instruction. Dispatch unit 223 creates a control signal designated "load_rs" for each reservation station. Dispatch unit 223 creates a "load_rs1" signal for reservation station RS1 430, and a "load_rs2" signal for reservation station RS2 432, and a "load_rs3" signal for reservation station RS3 434, and a "load_rs4" signal for reservation station RS4 436. The "load_rs" signal indicates which reservation station has been selected to be loaded with the most recently issued instruction. The "Issue Valid" signal from issue unit 222 is logically ANDed with the "load_rs" signal to set the MRI bit flag in the reservation station that is being loaded, and to clear the MRI bit flag in all of the other reservations stations.

Specifically, AND gate 420 passes the logical AND of the "load_rs1" signal and the "Issue Valid" signal to the MRI bit flag in reservation station RS1 430 when the "Issue Valid" signal is high. AND gate 422 passes the logical AND of the "load_rs2" signal and the "Issue Valid" signal to the MRI bit flag in reservation station RS2 432 when the "Issue Valid" signal is high. AND gate 424 passes the logical AND of the "load_rs3" signal and the "Issue Valid" signal to the MRI bit flag in reservation station RS3 434 when the "Issue Valid" signal is high. AND gate 426 passes the logical AND of the "load_rs4" signal and the "Issue Valid" signal to the MRI bit flag in reservation station RS4 436 when the "Issue Valid" signal is high. The outputs of each of the reservation stations are multiplexed through multiplexer 440.

When a reservation station is selected to be loaded and an instruction is issued from the reservation station, the reservation station sets the MRI bit flag in the instruction. Otherwise, the MRI bit flag is cleared (i.e., reset). For all the other pipeline stages, the MRI bit flag is set if it was set in the last stage and there has not been a new instruction issued.

Dispatch unit 223 then sends an instruction to execute unit 224. The instruction may or may not be the most recently issued instruction. When dispatch unit 223 selects an instruction to pass to execute unit 224, the instruction is selected from the appropriate reservation station by multiplexer 440. The MRI bit flag and other instruction control bits are then passed to the first stage of execute unit 224.

FIG. 5 illustrates a more detailed view of execute unit 224 and writeback unit 225. Execute unit 224 comprises an execution pipeline. The first stage of the execution pipeline is operand stage 510. Operand stage 510 receives floating point unit opcodes and operands from dispatch unit 223. The other stages in the execution pipeline are the exponent align stage 520, multiply stage 530, add stage 540, normalize stage 550, and round stage 560. Write back stage 225 writes the results back to data memory controller 234 and data cache 112 (as shown in FIG. 2).

The architecture of execute unit 224 illustrated and described above is well known to those skilled in the art. It should be noted that this conventional architecture is merely illustrative of one type of execute unit in which the MRI bit detection circuitry of the present invention may be embodied. Those skilled in the art will readily understand that an execute unit according to the principles of the present invention may be implemented in many other types of data processor architectures. Therefore, the description of the execute unit contained herein should not be construed so as to limit the scope of the apparatus and method of the present invention.

The present invention comprises MRI bit flag circuitry in each stage of execute unit 224 and in writeback unit 225. The MRI bit flag circuitry is indicated in FIG. 5 by the letters MRI that are located on the left hand side of each stage of execute unit 224. MRI bit flag circuitry 514 is in operand stage 510. MRI bit flag circuitry 524 is in exponent align stage 520. MRI bit flag circuitry 534 is in multiply stage 530. MRI bit flag circuitry 544 is in add stage 540. MRI bit flag circuitry 554 is in normalize stage 550. MRI bit flag circuitry 564 is in round stage 540. MRI bit flag circuitry 575 is in writeback unit 225.

Issue unit 222 sends an "Issue Valid" signal on control line 414 to indicate that issue unit 222 has issued a valid instruction. Control line 414 is coupled to a first input of each of a plurality of AND gates 512, 522, 532, 542, 552, 562, and 570. As shown in FIG. 5, each of the plurality of AND gates has an output that is coupled to the MRI bit flag circuitry in each stage of execute unit 224. Each of inputs of the AND gates to which control line 414 is coupled has an inverter so that the signal that each AND gate receives on the first input is an inverse of the "Issue Valid" signal.

For example, the input to the second input of AND gate 512 is the MRI bit flag signal from multiplexer 440 of dispatch unit 223. AND gate 512 performs the logical function "MRI bit flag AND NOT Issue Valid." AND gate 512 sends the result to the MRI bit flag circuitry 514 in operand stage 510. The MRI bit flag circuitry in each stage of the execution pipeline keeps track of the status of the MRI bit flag for the instruction as the instruction passes through each stage of the execution pipeline in execute unit 224.

As the instruction enters the exponent align stage 520, the MRI bit flag circuitry 514 of operand stage 510 passes a signal representing the MRI bit flag information to the second input of AND gate 522. In the same manner as that described for AND gate 512, AND gate 522 compares the signal "Issue Valid" from control line 414 and the signal from the MRI bit flag circuitry 514 from operand stage 510. AND gate 522 performs the logical function "MRI bit flag AND NOT Issue Valid." AND gate 522 sends the result to the MRI bit flag circuitry 524 in exponent stage 520.

The remaining stages in the execution pipeline operate in the same manner. Lastly, the MRI bit flag circuitry 575 in writeback unit 225 receives the MRI bit flag information from AND gate 570. If the MRI bit flag is set for the executed instruction, then writeback unit 225 sends the MRI bit flag information and status update information to issue unit 222 and updates status register 410. If the MRI bit flag is not set for the executed instruction (i.e., it is reset), writeback unit 225 does not send information to issue unit 222 and status register 410 is not updated.

Figure 6:
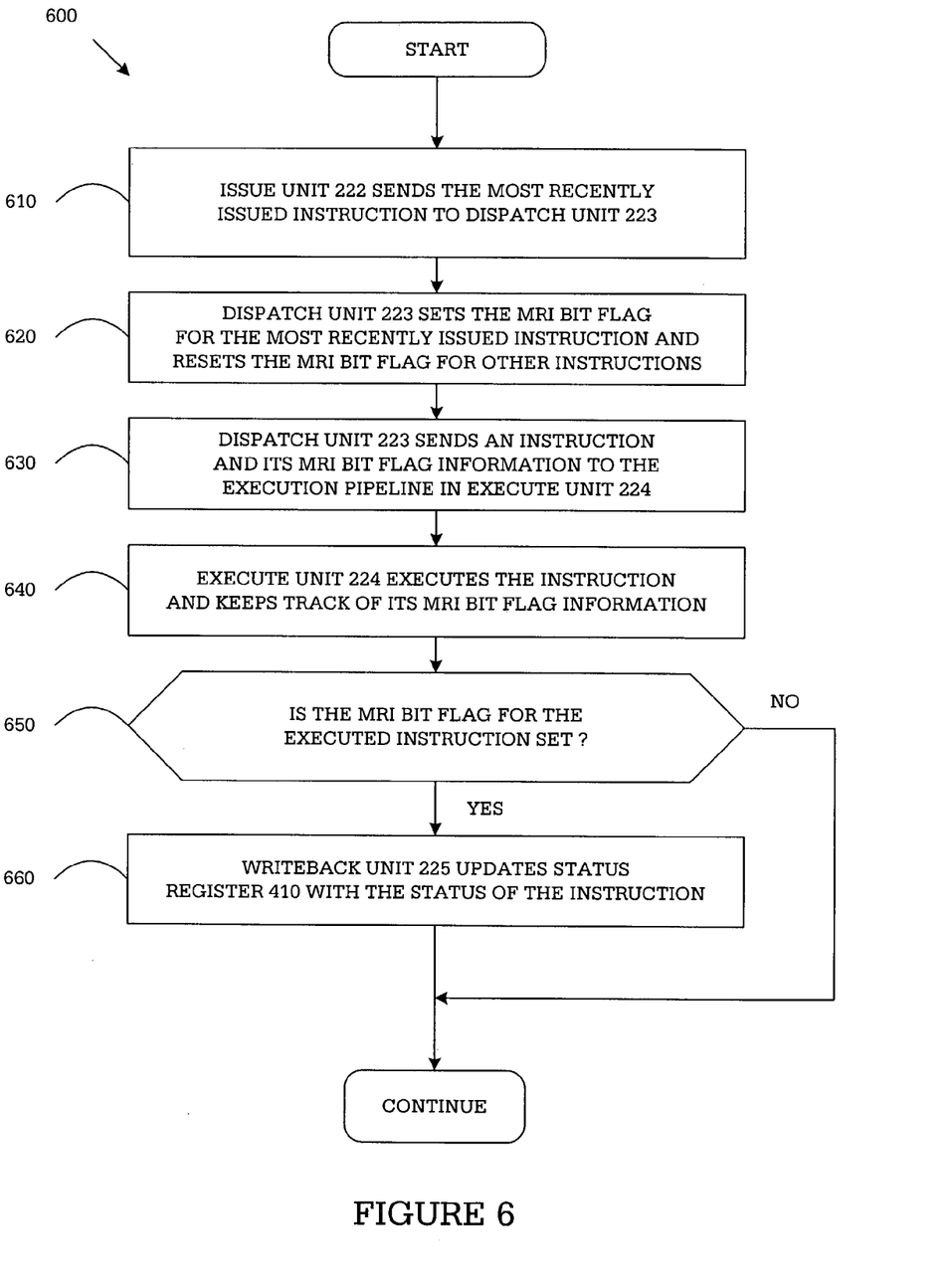
FIG. 6 illustrates a flow chart showing the operation of an advantageous embodiment of a first portion of the method of the present invention.

FIG. 6 illustrates a flow chart showing the operation of an advantageous embodiment of a first portion of the method of the present invention. The steps of the method shown in FIG. 6 are generally denoted with reference numeral 600.

Issue unit 222 sends the most recently issued instruction to dispatch unit 223 (step 610). Dispatch unit 223 sets the MRI bit flag for the most recently issued instruction. Dispatch unit 223 also resets the MRI bit flag for the other instructions that were previously issued (step 620). Then dispatch unit 223 sends an instruction and its MRI bit flag information to the execution pipeline in execute unit 224 (step 630). Because dispatch unit 223 may alter the order of the instructions, the instruction that dispatch unit 223 sends to execute unit 224 may or may not be the most recently issued instruction.

Execute unit 224 executes the instruction in the execution pipeline and passes the MRI bit flag information through each stage of the execution pipeline (step 640). After the instruction has been executed, writeback unit 225 determines whether the MRI bit flag for the instruction is set (decision step 650). If the MRI bit flag is set, then the instruction is the most recently issued instruction and writeback unit 225 updates status register 410 in issue unit 222 (step 660). If the MRI bit flag is not set (i.e., it is reset), then the instruction is not the most recently issued instruction. In that case control passes around step 660 and status register 410 in issue unit 222 is not updated.

Figure 7:
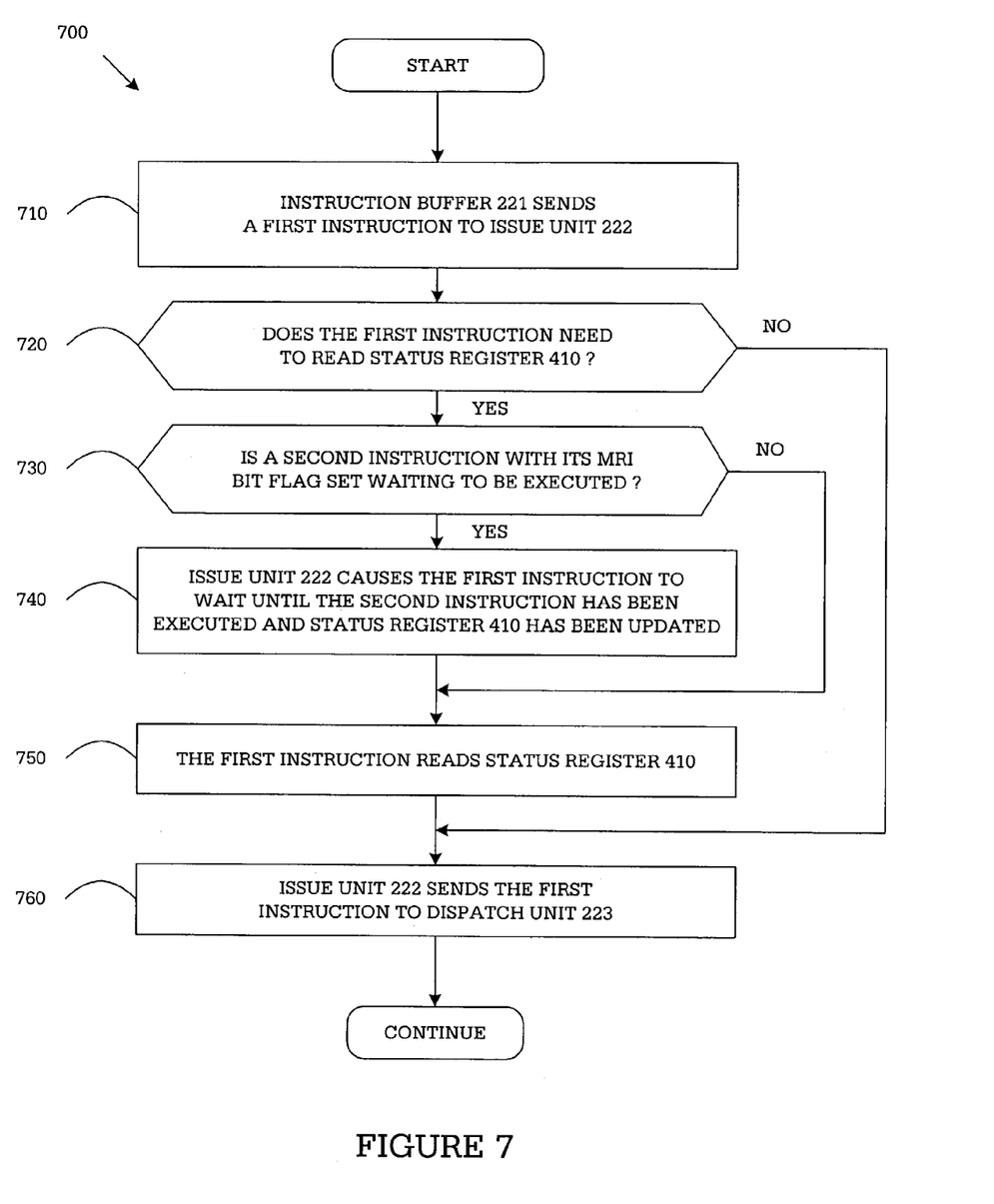
FIG. 7 illustrates a flow chart showing the operation of an advantageous embodiment of a second portion of the method of the present invention.

FIG. 7 illustrates a flow chart showing the operation of an advantageous embodiment of a second portion of the method of the present invention. The steps of the method shown in FIG. 7 are generally denoted with reference numeral 700.

Instruction buffer 221 sends a first instruction to issue unit 222 (step 710). In some cases the first instruction will need to read data in status register 410. Issue unit 222 determines whether the first instruction needs to read data in status register 410 (decision step 720). If the first instruction does not need to read data in status register 410, then control passes to step 760 and the issue unit 223 sends the first instruction to dispatch unit 223 (step 760). If the first instruction does need to read data in status register 410, then issue unit 223 determines whether there is a second instruction with an MRI flag set that is currently waiting to be executed in dispatch unit 223, in execute unit 224 or in writeback unit 225 (decision step 730).

If there is no second instruction with an MRI flag set that is waiting to be executed, control passes to step 750 and the first instruction reads the data in status register 410 (step 750). If there is a second instruction with an MRI flag set that is waiting to be executed, issue unit 222 causes the first instruction to wait until the second instruction has been executed and status register 410 has been updated (step 740). After the second instruction has been executed and status register updated, then the first instruction reads the data in status register 410 (step 750). Then issue unit 222 sends the first instruction to dispatch unit 223 (step 760). The execution process then continues.

The apparatus and method of the present invention solve a problem that is known in computer architecture as the "write after write hazard." One wants status register 410 to contain the status of the last instruction to enter the execution pipeline of execution unit 224 before the status is checked. Because the order of the instructions may be altered in dispatch unit 223, the last instruction to enter dispatch unit 223 may not be the last instruction to exit the execution pipeline of execute unit 224. If every instruction wrote its status to the status register 410 after the instruction completed its execution, then status register 410 would contain the status of the last instruction to exit the execution pipeline of execute unit 224 rather than the status of the last instruction to enter dispatch unit 223. This would lead to the occurrence of the "write after write hazard" and the possibility of the occurrence of errors.

The apparatus and method of the present invention provides a mechanism for keeping track of the "most recently issued" instruction. The MRI bit flag is set for the "most recently issued" instruction. Only an instruction with its MRI bit flag set will update status register 410 after the instruction has completed its execution. In this way it is possible to keep track of the instruction that is the most recent instruction to enter dispatch unit 223.

Although the present invention has been described as an exemplary embodiment within a floating point unit of a data processor, various changes and modifications may be suggested to one skilled in the art. It is intended that the present invention encompass such changes and modifications as fall within the scope of the appended claims.

What is claimed is:

1. An apparatus in a data processor for updating a status register in an out of order pipeline, said apparatus comprising:
an execution pipeline comprising a plurality of execution stages to execute an instruction in a series of sequential steps;
a status register to store updated status information of an instruction only when said execution pipeline executes an instruction that is the most recently issued instruction of a plurality of issued instructions.

2. The apparatus as set forth in claim 1 wherein each instruction that is provided to said execution pipeline comprises an MRI bit flag that indicates whether said instruction is an instruction that is the most recently issued instruction.

3. The apparatus as set forth in claim 2 further comprising:
an issue unit comprising said status register; and
a dispatch unit coupled to said issue unit, said dispatch unit to receive instructions issued from said issue unit, wherein said dispatch unit comprises a plurality of reservation stations to buffer instructions received from said issue unit;
wherein each of said plurality of reservation stations to set an MRI bit flag in an instruction that is the most recently issued instruction and to reset an MRI bit flag in all other instructions.

4. The apparatus as set forth in claim 3 further comprising:
an execute unit coupled to said dispatch unit, wherein said execute unit comprises an execution pipeline comprising a plurality of execution stages to execute in a series of sequential steps said instructions that comprise an MRI bit flag;
wherein each execution stage in said execution pipeline comprises MRI bit flag circuitry to receive MRI bit flag information for an instruction from a previous execution stage and to send MRI bit flag information for an instruction to a subsequent execution stage.

5. The apparatus as set forth in claim 4 wherein said plurality of execution stages comprises an operand stage, an exponent align stage, a multiply stage, an add stage, a normalize stage, and a round stage.

6. The apparatus as set forth in claim 4 further comprising:
a writeback stage coupled to said execute unit, wherein said writeback unit comprises MRI bit flag circuitry to receive MRI bit flag information for an instruction that has been executed by said execute unit;
wherein said writeback unit is to determine whether said MRI bit flag for said executed instruction is set and, in response to said determination, one of: (1) update said status register in said issue unit if said executed instruction has said MRI bit flag set, and (2) not update said status register in said issue unit if said executed instruction has said MRI bit flag reset.

7. The apparatus as set forth in claim 3 wherein said issue unit is to cause a first instruction for reading data from said status register to wait to read said data from said status register until a second instruction having an MRI bit flag set has been executed and said status register has been updated to reflect said execution of said second instruction.

8. A data processor comprising:
a memory unit to retrieve instructions and operands from memory, store said retrieved instructions in an instruction cache and store said retrieved operands in a data cache;
an integer unit to retrieve instructions from said instruction cache and executing integer instructions in an integer instruction execution pipeline of said integer unit; and
a floating point unit to receive floating point opcodes from said integer unit, said floating point unit comprising:
a floating point execution pipeline comprising a plurality of execution stages to execute an instruction in a series of sequential steps;
a status register to store updated status information of an instruction only when said floating point execution pipeline executes an instruction that is the most recently issued instruction of a plurality of issued instructions.

9. The data processor as set forth in claim 8 wherein each instruction that is provided to said floating point execution pipeline comprises an MRI bit flag that indicates whether said instruction is an instruction that is the most recently issued instruction.

10. The data processor as set forth in claim 9 further comprising:
an issue unit comprising said status register; and
a dispatch unit coupled to said issue unit, said dispatch unit to receive instructions issued from said issue unit, wherein said dispatch unit comprises a plurality of reservation stations to buffer instructions received from said issue unit;
wherein each of said plurality of reservation stations is to set an MRI bit flag in an instruction that is the most recently issued instruction and to reset an MRI bit flag in all other instructions.

11. The data processor as set forth in claim 10 further comprising:
an execute unit coupled to said dispatch unit, wherein said execute unit comprises a floating point execution pipeline comprising a plurality of execution stages to execute in a series of sequential steps said instructions that comprise an MRI bit flag;
wherein each execution stage in said floating point execution pipeline comprises MRI bit flag circuitry to receive MRI bit flag information for an instruction from a previous execution stage and send MRI bit flag information for an instruction to a subsequent execution stage.

12. The data processor as set forth in claim 11 wherein said plurality of execution stages comprises an operand stage, an exponent align stage, a multiply stage, an add stage, a normalize stage, and a round stage.

13. The data processor as set forth in claim 11 further comprising;
a writeback stage coupled to said execute unit, wherein said writeback unit comprises MRI bit flag circuitry to receive MRI bit flag information for an instruction that has been executed by said execute unit;
wherein said writeback unit is to determine whether said MRI bit flag for said executed instruction is set and, in response to said determination, one of: (1) update said status register in said issue units if said executed instruction has said MRI bit flag set, and (2) not update said status register in said issue unit if said executed instruction has said MRI bit flag reset.

14. The data processor as set forth in claim 10 wherein said issue unit is to cause a first instruction for reading data from said status register to wait to read said data from said status register until a second instruction having an MRI bit flag set has been executed and said status register has been updated to reflect said execution of said second instruction.

15. For use in a data processor, a method for updating a status register in an out of order execution pipeline, said method comprising the steps of:
providing an out of order execution pipeline that comprises a plurality of execution stages that are capable of executing instructions in a series of sequential steps;
providing a status register that is capable of containing status information of an instruction; and
updating status information in said status register only when said out of order execution pipeline executes an instruction that is the most recently issued instruction of a plurality of issued instructions at the execution pipeline.

16. The method as set forth in claim 15 further comprising the step of:
providing instructions to said out of order execution pipeline wherein each instruction comprises an MRI bit flag that indicates whether said instruction is an instruction that is the most recently issued instruction.

17. The method as set forth in claim 16 further comprising the steps of:
providing in said out of order execution pipeline an issue unit that comprises said status registers;
coupling a dispatch unit for said issue unit, wherein said dispatch unit comprises a plurality of reservation stations that are capable of buffering instructions received from said issue unit;
receiving instructions from said issue unit in said plurality of reservation stations in said dispatch unit;
setting an MRI bit flag in an instruction that is the most recently issued instruction in at least one of said plurality of reservation stations; and
resetting an MRI bit flag in all other instructions.

18. The method as set forth in claim 17 further comprising the steps of:
providing in said out of order execution pipeline an execute unit coupled to said dispatch unit, wherein said execute unit comprises a floating point execution pipeline comprising a plurality of execution stages;
executing in said execution stages of said floating point execution pipeline an instruction that comprises an MRI bit flag;
receiving in each execution stage MRI bit flag information for said instruction from a previous execution stage; and
sending said MRI bit flag information for said instruction to a subsequent execution stage.

19. The method as set forth in claim 18 further comprising the steps of:
providing in said out of order execution pipeline a writeback unit coupled to said execute unit;
receiving in said writeback unit MRI bit flag information for an instruction that has been executed by said execute unit;
determining in said writeback unit whether said MRI bit flag for said executed instruction is set and, in response to said determination, one of: (1) updating said status register in said issue unit if said executed instruction has said MRI bit flag set, and (2) not updating said status register in said issue unit if said executed instruction has said MRI bit flag reset.

20. The method as set forth in claim 17 further comprising the steps of:
determining in said issue unit that a first instruction needs to read data from said status register;
determining in said issue unit that a second instruction having an MRI bit flag set has not yet been executed; and
causing said first instruction to wait to read said data from said status register until said second instruction has been executed and said status register has been updated to reflect said execution of said second instruction.

* * * * *